United States Patent [19]

Wright

[11] E Re. 30,232

[45] Reissued Mar. 18, 1980

[54] LARGE CAPACITY FILM CASSETTE

[75] Inventor: Joseph H. Wright, Marblehead, Mass.

[73] Assignee: Polaroid Corporation, Cambridge, Mass.

[21] Appl. No.: 933,721

[22] Filed: Aug. 14, 1978

Related U.S. Patent Documents

Reissue of:

[64] Patent No.: 4,018,518
Issued: Apr. 19, 1977
Appl. No.: 531,340
Filed: Dec. 10, 1974

[51] Int. Cl.[2] ..... G03B 23/02

[52] U.S. Cl. ..... 352/78 R; 352/124; 242/200

[58] Field of Search ..... 352/72, 78 R, 124, 173; 242/199, 200, 205, 67.4; 40/93, 95

[56] References Cited

U.S. PATENT DOCUMENTS

| | | | |
|---|---|---|---|
| 2,275,497 | 3/1942 | Berndt | 242/200 |
| 2,474,972 | 7/1949 | Coutant et al. | 352/78 R |
| 2,896,873 | 7/1953 | Mageoch | 242/67.4 |
| 3,017,804 | 1/1962 | Bonisch et al. | 352/72 |
| 3,480,351 | 11/1969 | Blaschek | 352/78 R |
| 3,600,070 | 8/1971 | Downey | 352/72 |
| 3,604,790 | 9/1971 | Land | 352/78 R |
| 3,767,294 | 5/1972 | Kosarko | 352/78 R |
| 3,782,812 | 1/1974 | Roller | 352/72 |
| 3,807,841 | 4/1974 | Dudley | 352/75 |
| 3,825,327 | 7/1974 | Kosarko et al. | 352/72 |
| 3,918,802 | 11/1975 | Sakaguchi et al. | 352/72 |

FOREIGN PATENT DOCUMENTS

| | | | |
|---|---|---|---|
| 646544 | 11/1950 | United Kingdom | 352/78 R |

*Primary Examiner*—L. T. Hix
*Assistant Examiner*—Alan Mathews
*Attorney, Agent, or Firm*—David R. Thornton

[57] ABSTRACT

A photographic film cassette including a drive transmission arrangement configured for operating a film capstan and for selectively driving supply and take-up reels of the cassette responsive to projector driving operation. The cassette is a large capacity film cassette for use with automatic projector apparatus of the type having a cassette-receiving well smaller than the space occupied by take-up and supply reels of the large capacity cassette and is provided with a tongue-like housing portion receivable in the cassette well of the projection apparatus. Contained within the cassette is reversible drive transmission by which drive spindles in the cassette well are coupled to both an isolating capstan and the film reels to effect advancing movement of the film strip from the supply reel to the take-up reel during projection and rewinding movement of the film strip back to the supply reel after projection.

8 Claims, 5 Drawing Figures

LARGE CAPACITY FILM CASSETTE

Matter enclosed in heavy brackets [ ] appears in the original patent but forms no part of this reissue specification; matter printed in italics indicates the additions made by reissue.

BACKGROUND OF THE INVENTION

This invention relates to photographic film cassettes and, more particularly, it concerns a novel large capacity film cassette for use with projection apparatus having film drive and projection components disposed within a receiving well establishing an essentially enclosed space smaller than the space occupied by the film strip coiled within the novel cassette.

U.S. Pat. Nos. 3,778,140 and 3,800,306 issued respectively on Dec. 11, 1973 and Mar. 26, 1974 to Edwin H. Land contain exemplary disclosures of a motion picture system by which a supply of light-sensitive film contained in a multi-purpose cassette can be exposed in a camera adapted to receive the cassette and then processed or developed to provide the conventional series of positive transparent image frames by placing the cassette in a projection apparatus or viewer capable of activating a processor also contained in the cassette. In such systems, once the film strip has been exposed, the image sequence recorded thereon may be viewed by projection after a time interval only as long as that required to rewind the film strip and during which the processing operation is performed. Also, repeated projection cycles may be carried out subsequent to processing a film strip in a given cassette merely by replacing that cassette to the receiving well of the viewer which is equipped with an automated control system capable of detecting the processed or unprocessed condition of the cassette. Where the multi-purpose cassette had been previously processed, the control system operates the projection apparatus through a projection cycle, followed by a film strip rewind cycle and ejection of the cassette from the well.

The multi-purpose film cassette by which the film processing operation is effected in such systems most appropriately functions as an essentially permanent receptacle for the film strip contained therein beginning with packaging of the unexposed light-sensitive film strip, throughout exposure and processing and as a permanent storage and handling receptacle for the film strip after processing for repeated projection cycles if desired. One of the major advantages of the multi-purpose cassette, therefore, apart from the facility it offers for instant processing, is that it obviates any need for physical handling or direct manipulation of the film strip itself. On the other hand, capacity of such a multi-purpose film cassette or the length of the film strip it will accommodate is a compromise of such factors as the length of film strip to be sold in one package, the desirable length of film strip to be exposed without removal from the camera and the length of developed film strip to be viewed or projected at one time. Obviously, the ideal length for projection is much greater than that for packaging or for exposure particularly for amateur photographers.

In addition, the projection apparatus or viewer of such systems represents perhaps the largest single investment required of one to use the overall system. Although the viewer is particularly adapted to handle multi-purpose film cassettes of the type containing a supply of processing fluid for the development of film contained in the cassette after exposure, it provides a highly sophisticated projection apparatus adaptable for use also with films supplied, exposed and developed by conventional means as well as with films of longer and thus more desirable projection lengths than those available in the multi-purpose cassette designed expressly for the system. It should also be realized, however, that since the projector is designed for a cassette of specific capacity having given spool inertia, etc., some accommodation must be provided where a cassette of large capacity is employed.

SUMMARY OF THE INVENTION

Broadly, the film cassette of the present invention includes a transmission arrangement which, in response to projector operation, drives either a take-up or supply spool and at least one film capstan of the cassette; the capstan being effective to isolate film spool inertia from other elements of the cassette and the projector.

In the illustrated embodiment, a large capacity film cassette is provided for use with projection apparatus, expressly designed for systems of the aforementioned type having a cassette-receiving well of the size and configuration to enclose a multi-purpose cassette of much smaller capacity. The large capacity film cassette of the invention encloses a pair of axially spaced, radially aligned supply and take-up reels of such a size and dimension so that they are not receivable in the cassette well of the viewing apparatus. The cassette is provided with a projecting tongue conforming in size and shape to the viewing apparatus cassette-receiving well and is equipped with film strip guiding means within the tongue by which the film strip from the enlarged supply and take-up reels may be advanced for projection or rewound automatically merely by inserting the tongue in the cassette well. To facilitate appropriate film advancement including driving of the supply and take-up reels of the large capacity cassette, a reversible drive transmission including a film capstan is contained in the large capacity cassette and functions automatically to drive the take-up reel during projection and the supply reel during rewind without any modification of the projection apparatus whatsoever and without attention by the operator.

Accordingly, it is among the objects of the present invention to provide a large capacity film cassette capable of operation by a projection apparatus designed for small capacity cassettes; the provision of such an enlarged capacity film cassette which requires no adjustment or manipulation of either the cassette or the projector other than to insert a portion of the cassette into the projector; the provision of such an enlarged capacity film cassette having automatic and reversible reel drive means; and the provision of such an enlarged capacity film cassette which is uncomplicated and thus easily assembled and handled.

Other objects and further scope of applicability of the present invention will become apparent from the detailed description to follow taken in conjunction with the accompanying drawings in which like reference numerals designate like parts.

DETAILED DESCRIPTION OF THE PREFERRED EMBODIMENT

Figure 1:
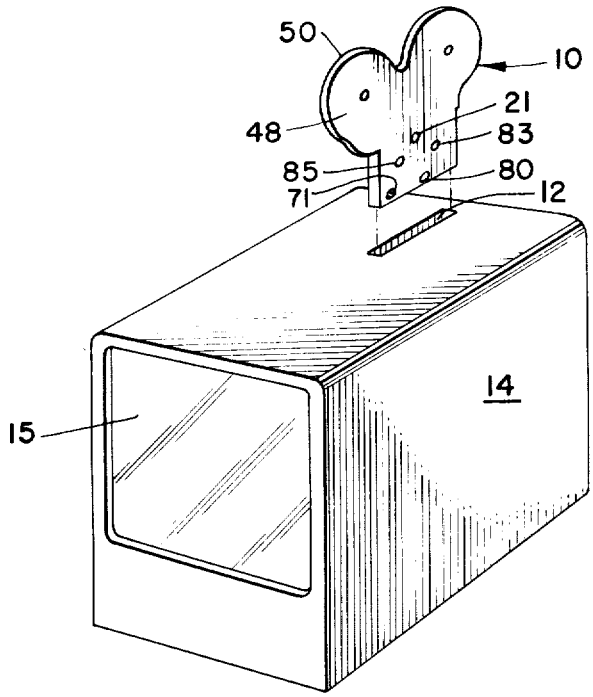
FIG. 1 is a perspective view illustrating the viewing apparatus and enlarged capacity film cassette of the present invention.

In FIG. 1 of the drawing, the enlarged capacity film cassette of the present invention is generally designated by the reference numeral 10 and shown in a position for insertion into a cassette-receiving well 12 presented on the top of a projection apparatus or viewer 14 having a rear projection screen 15. In the context of the present invention, the viewer 14 represents existing equipment and is fully disclosed in the above-mentioned U.S. Pat. Nos. 3,778,140 and 3,800,306 among other patents and applications owned in common with the present invention.

Figure 4:
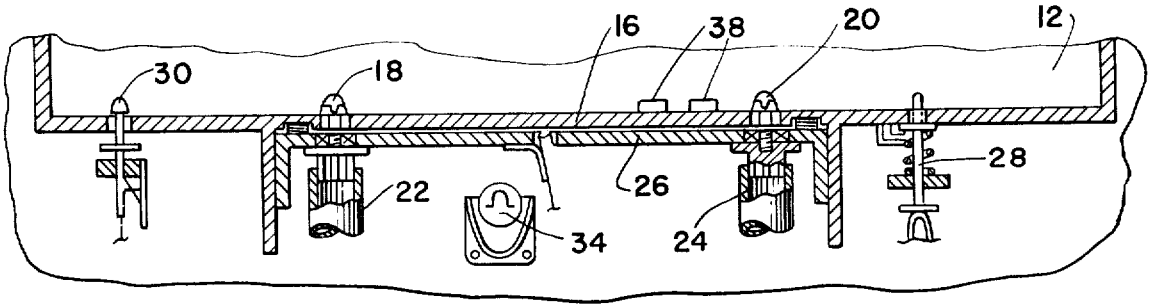
FIG. 4 is an enlarged fragmentary cross-section illustrating the essential working components contained in the cassette-receiving well of the projection apparatus illustrated in FIG. 1.
Figure 5:
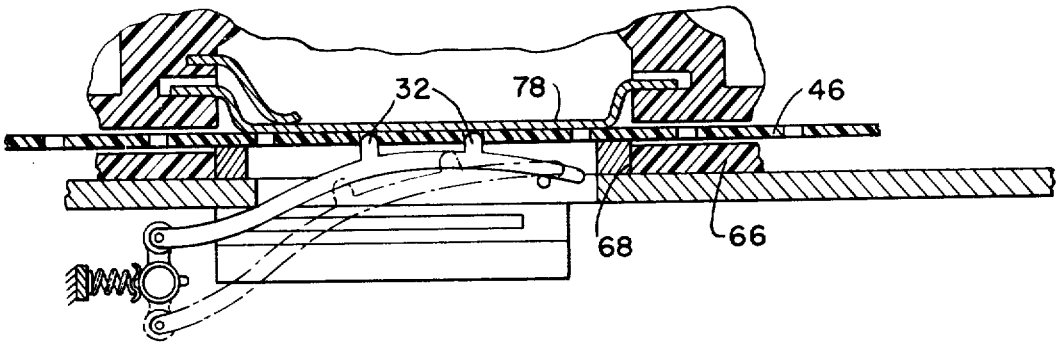
FIG. 5 is an enlarged fragmentary section illustrating the incremental film stepping drive means in the projector of FIG. 1.

Although a detailed description of the viewer 14 need not be repeated herein for a complete understanding of the present invention, reference is made to FIGS. 4 and 5 of the drawing for a brief summary of the major operating components presented within the well 12 and which cooperate with a multi-purpose film cassette for the projection of light through sequential image frames during advance movement of a cassette contained film strip. First, it should be noted that the multi-purpose cassette (not shown) of the system described in the above-noted patents includes a parallelepiped housing formed by a pair of rectangular planar walls joined together by a plurality of narrow end walls. A pair of film reels located within the housing underlie respective openings in one of the planar walls by means of which drive sprockets 18 and 20 of the viewer 14 couple to the reels for driving of the latter during film movement. Additionally, a further opening is provided in the one cassette wall for access to a snubber member which is selectively locked during forward film advancement.

Turning again to the projector 14, the well 12 is of a shape to receive the rectangular parallelpiped cassette (not shown) and is provided in one vertical side wall 16 with openings through which several viewer components project. In particular, the pair of drive sprockets 18 and 20 are carried at the ends of the drive spindles 22 and 24 which are, in turn, mounted for axial movement on a spindle plate 26. The spindle plate is operated automatically to move the sprockets 18 and 20 between an operative drive position within the well 12 as shown in FIG. 4 and a retracted position to enable insertion and removal of a cassette from the well. A locking pin 28 is adapted to be advanced through the wall 16 to engage a complementary recess in a cassette and retain it within the well 12 as well as to set into operation certain of the automatic electric control circuitry (not shown) in the viewer 14. Also, a snubber stop pin 30 is arranged for movement into and out of engagement with a cassette contained snubber or guide roller which, when engaged by the stop 30, operates to retain a film strip in predetermined incremental positions to which it is advanced by the film drive pawls 32 shown in FIG. 5. A projection lamp 34 having a reflector 36 is provided to direct light through an aperture (not shown) in the wall 16 of the well to a reflecting surface on the interior of the cassette and then through an optical system including the screen 15.

Although the interconnection of the respective projector apparatus components presented on the interior of the well 12 with components of the cassette 10 will be described in more detail below, it should be noted that the projecting apparatus or viewer 14 as described in the aforementioned patents is essentially automatic in its operation following the insertion of a cassette into the well 12. Where the cassette is a multi-purpose cassette of the type containing processing liquid in accordance with the systems described in the aforementioned patents, the processed or unprocessed condition of the film strip contained therein is sensed by viewer circuitry to determine whether the viewer is to operate first through a process mode or whether the viewer is operated directly in a projection mode upon insertion of the cassette. The manner in which the condition of such a multi-purpose cassette is sensed involves movement of a cassette contained processing component from a position in which it effects a circuit continuity across a pair of terminals 38 in the well 12 to a position after processing in which the circuit between the terminals 38 is discontinued. Thus, insertion of a cassette into the well with no electrical bridging of the terminals 38 will effect automatically an extension of the spindle plate 26 as well as operation of the drive pawls 32 to advance the cassette contained film strip incrementally throughout its length. Upon reaching the end of the film strip, the control system of the viewer automatically rewinds the film strip and partially ejects the cassette.

In the multi-purpose film cassette contemplated by the systems described in the aforementioned patents, the length of film strip, which can be accommodated by supply and take-up reels contained within the cassette and driven directly by the drive sprockets 18 and 20, is approximately fifty feet; providing with eight millimeter film, a projection duration for each cassette of approximately five minutes. Although the time interval required for changing such cassettes is minimized by the automated operation of the viewer and also by the ease with which the cassettes may be manipulated, a longer uninterrupted projection period is obviously more desirable in many instances. In accordance with the present invention, the enlarged capacity film strip 10 may accommodate a film strip length of 250 feet or more without compromise in completely effective use of the viewer 14 as a projector.

Figure 2:
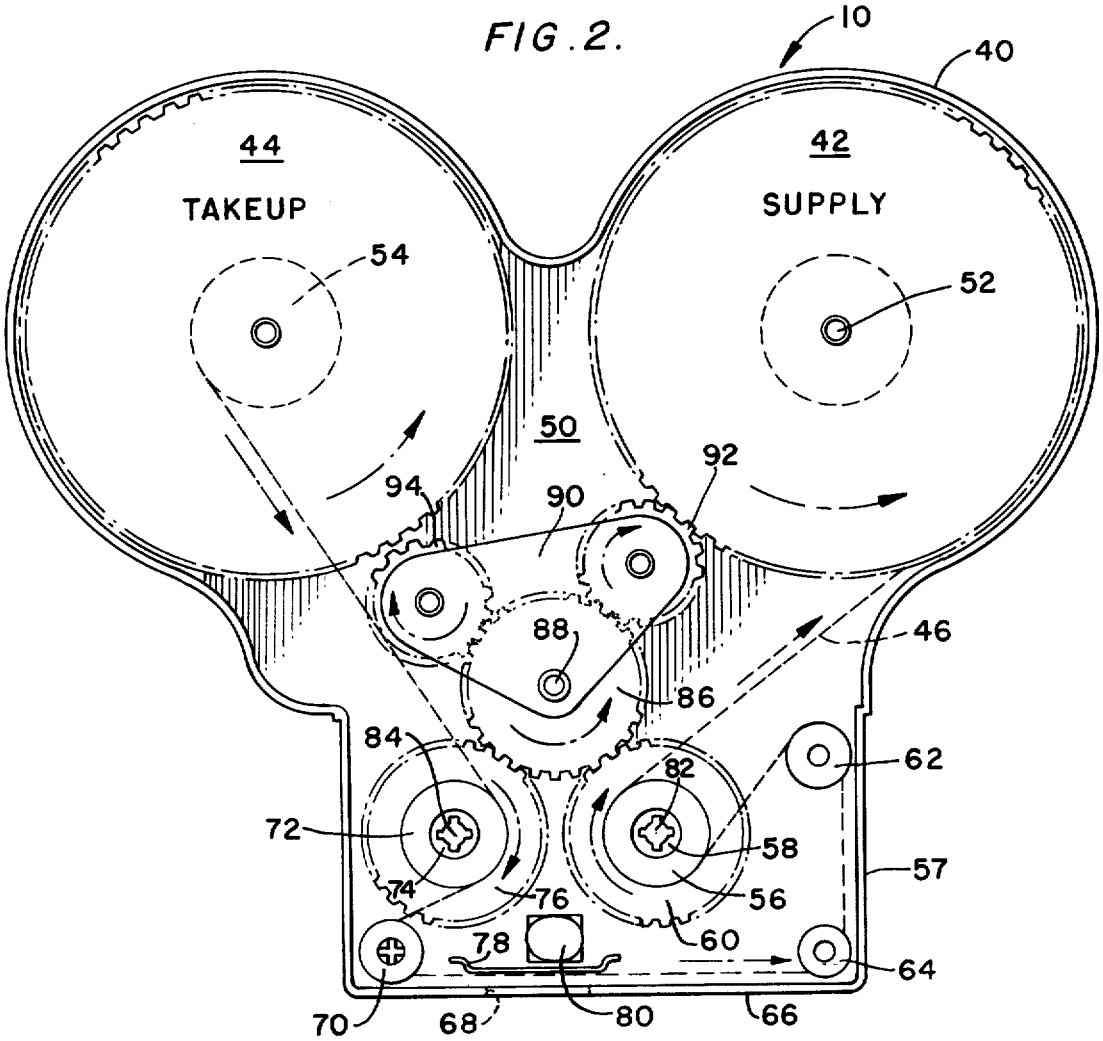
FIG. 2 is an enlarged vertical cross-section illustrating the internal components of the enlarged capacity film cassette.
Figure 3:
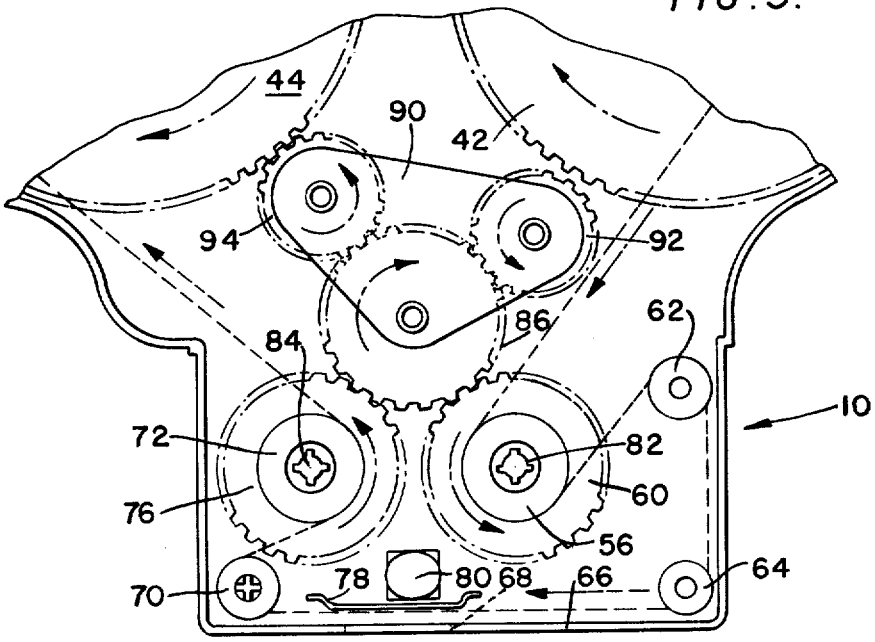
FIG. 3 is a fragmentary cross-section similar to FIG. 1 but illustrating components within the cassette in a different operating relation.

As shown in FIGS. 1-3, the enlarged capacity film cassette 10 includes an external housing 40 which completely encloses radially aligned, axially spaced supply and take-up spools or reels 42 and 44, each is of sufficient size to accommodate a film strip 46 of a length on the order of 250 feet or more. The housing 40 includes front and back essentially planar walls 48 and 50 respectively spaced from each other by a distance to accommodate the axial length of the film reels 42 and 44. The reels are journalled within the housing on bearing pins 52 and 54 which are preferably cantilevered from the rear wall 50 to enable at least a portion of the front wall 48 to be removable in the manner of an openable closure. In this way, interchangeability of the reels and of the film strip in the cassette is accommodated. This arrangement can be utilized by the purchaser to repair a film break or for loading the novel cassette with the user's film. Preferably, however, where the large cassette 10 is to be employed for the user's previously acquired film, the novel cassette will be supplied with a leader strip or blank film strip of relatively short length connected at respective ends to the film reels and threaded through the cassette film path described in detail below. For loading, the user will be directed to withdraw a loop of the leader through a projection opening 68, cut the leader and splice the operator's film (removed from one or more of the aforementioned multi-purpose cassettes) to the leader so as to again complete a film loop extending between the reels. In this manner, the cassette 10 could be fully loaded with the operator's film.

Turning again to the detailed description of the large capacity cassette 10, it should be noted that in the illustrated embodiment the housing 40 is shaped to provide first large section 55 and a second smaller section or tongue portion 57. The tongue 57, in turn, is of a rectangular parallelpiped shape having a configuration resembling the aforementioned multi-purpose cassette and complements the interior configuration of the viewer well 12. It will be appreciated, therefore, that the cassette 10 may be associated operatively with the viewer 14 by insertion of the tongue 56 into the well 12 of the viewer.

As shown in FIGS. 2 and 3, the flight path of the film strip 46 in passing from the supply reel 42 to the take-up reel 44 proceeds from the supply reel 42 about first capstan 56 fixedly mounted to a hub 58 of a gear 60, over rollers 62 and 64, along the inside of a bottom wall 66 of the housing tongue 57, past the projection opening 68 in the wall 66, about a snubbing roller 70, upwardly about second capstan 72 mounted to a hub 74 of a second gear 76, and then to the take-up reel 44. In passing the opening 68, the film strip 46 is constrained to a planar orientation by the spring-biased pressure plate 78 positioned under a reflecting prism 80.

The organization of components traversed by the film strip 56 in passing first capstan 56 to the second capstan 72 serves essentially the same function as comparable components contained in the multi-purpose film cassettes described in the aforementioned patents. Thus, during projection of the film, the feed pawls 32 operate to advance the film strip incrementally, frame by frame, past the opening 68 so that light emitted by the lamp 34 will pass through prism 80 and then downwardly through the film strip 46 through the remaining optical components (not shown) and presented as a motion picture image on the screen 15 of the viewer 14. The first capstan 56 as later explained in detail enables relatively rapid incremental advances of the film strip past the opening 68 without interference from the supply reel inertia whereas the snubber 70 permits a constant take-up tension in the film strip run between it and the take-up reel 44 without causing movement of the film strip portion at the opening 68 other than that effected by the pawls 32. In this respect the snubber 70 is engaged during projection by the stop 30 so that it operates in the manner of a fixed capstan or snubber rather than as a guide roller. During rewind movement of the film, however, the stop pin 30 is retracted to allow the snubber 70 to operate simply as a guide roller.

To enable proper control over rotation of the supply and take-up reels 42 and 44, as well as the capstans 56 and 72, a drive transmission means is provided in the cassette housing 40 to couple the viewer mounted drive sprockets 18 and 20 with the capstans 56, 72 and alternately with the supply and take-up reels 42 and 44. Specifically, the hubs 58 and 74 of the gears 60 and 76 aforementioned provide means for coupling to the projector drive, and hence are provided with sockets 82 and 84 into which the respective drive sprockets 20 and 18 of the projector extend to couple the projector drive with the gears 60 and 76. Both gears 60 and 76 function as drive gears and mesh with a common sun gear 86 having an axle 88 journalled in the front and rear walls 48 and 50 of the cassette housing 40. Hence, both gears 60 and 76 and, more importantly, their capstans 56 and 72 are driven with driving operation of either of the projector drive sprockets 18 and 20.

As indicated previously, the tongue portion 56 provides an external configuration essentially duplicating that of the multi-purpose cassette for which the projector 14 is designed. Hence, in the tongue portion, the side wall 48 carries: openings 83 and 85 which provide access to sockets 82 and 84 of the gears 60 and 76 respectively; an opening 71 for access to the snubber 70; an opening 81 for emitting light to the prism 80; and an opening 21 which is designed to accept the latching pin 28.

Journalled for pivotal movement on the hub 88 is a rocker arm 90 which supports a pair of shiftable planet gears 92 and 94, both of which are also in continuous meshing engagement with the gear 86. As shown in FIG. 2, the rocker arm 90 is oriented on the axle 88 of the gear 86 such that the gear 92 is in engagement with teeth on the periphery of the supply reel 42 whereas the gear 94 is out of engagement with similar teeth on the periphery of the take-up reel 44. In FIG. 3, the position of the rocker arm 90 is reversed so that the gear 94 engages the take-up reel 44 whereas the gear 92 is in a position out of engagement with the supply reel 42. Hence, it should be understood that the planet gears 92, 94, sun gear 86 and the gears 60 and 76 provide a shiftable driving connection between the coupling means (hubs 82 and 84) and the reels 42 and 44. Additionally, however, the capstans 56 and 72 along with the roller 62, 64 and snubber 70 provide means for guiding the film strip from one reel through the tongue portion and to the other reel.

In light of the described structural organization, the operation of the enlarged capacity cassette 10 in the viewer 14 may now be understood. Turning first to FIG. 3 and assuming the film strip 46 has been wound on the supply reel 42 with an appropriate leader extending to the take-up reel 44 along the flight path illustrated in this figure, when the cassette 10 is inserted into the well 12 of the viewer, the projecting mode of operation with foward film drive will automatically result due to the absence of any conductive component on the cassette tongue 56 to complete a circuit between the terminals 38. That is, as soon as the locating pin 28 advances into the complementing recess 21 in the front wall 48 of the cassette, the spindle plate 26 will advance the sprockets 18 and 20 into the hub sockets 84 and 82 of the gears 76 and 60 respectively. Also, the snubber roll stop 30 will advance into the snubber 70, the lamp 34 will be turned on, and the incremental driving pawls 32 will engage the film strip to advance it incrementally in a forward direction (from the supply spool 42 to the take-up spool 44), frame by frame, past the opening 68. During this time, the drive sprocket 18 is operative to rotate the gear 76 in a counterclockwise (ccw) direction or in the direction of the arrows in FIG. 3 of the drawings whereas the sprocket 20 is idling at this time in accordance with conventional operation of the viewer. As a result of such ccw rotation of the gear 76, the gear 86 will be rotated in a clockwise (cw) direction to effect rotation of the gear 60 and the shiftable planet gears 90 and 94 in a counterclockwise (ccw) direction. The position of the rocker arm 90 is dependent on the direction of rotation of the gear 86 due to a frictional drag tending to oppose rotation of either shiftable gear 90 or 92 on its bearing or of a rotational drag in the pivotal mount of the arm on the axle 88 of the gear 86. Such a drag may be merely as a result of inherent friction in any of the three bearings involved. As a result of the pivoting of the rocker arm 90, the drive transmission is operative to drive the take-up spool 44 in a clockwise direction to effect the continuous linear movement of the film strip which is essentially an average of the incremental feed by the sliding pawl 32.

It should be noted that where the drive sprocket 18 is driven at constant angular velocity, there would be a tendency for the linear speed of the film strip to increase as convolutions of the strip are build up on the take-up reel. The drive spindle 22, however, is provided with a slip clutch arrangement (not shown) such that the actual angular rotation of the take-up reel will be governed by the passage of film around the snubbing roll 70. Accordingly, the linear velocity of the film strip onto the take-up reel will remain relatively constant at a speed determined by the claw arrangement. This is of interest herein since as explained below in detail, it provides a constant speed for both capstans 56 and 72.

As previously noted, ccw rotation of the drive sprocket 18 and the gear 76 provides ccw rotation of the gear 60. Hence, the first capstan 56 is also rotated in a ccw direction which tends to feed film from the supply spool 42 toward the projector drive pawls 32. Advantageously, this operation of the capstan tends to isolate the intermittent pawl drive motion from, or relieves it of, the supply reel inertia. That is, the capstan 56 tends to draw film from the supply reel and appropriately rotate the latter. The pawls 32 merely need to pull film from the capstan feed. If the supply reel speed drops below that necessary to supply increments for the pawls 32, the capstan will bring the reel up to necessary speed whereas if the supply reel speed exceeds that value, the thereby created film slack reduces the film tension against the first capstan 56 which reduces film feed and ultimately leads to lower supply reel speed. Hence, in both situations as well as during start up, the capstan 56 effectively isolates the pawl, or the film portion thereat from the supply reel force.

It should also be noted that in this arrangement where the rotation of the gear 76 is dominated by the amount of film fed by the pawls 32 to the snubber, the second capstan 72 will essentially rotate at the average film speed provided by the pawl operation. Hence, the first capstan which is coupled to the second will also rotate at such average film speed.

When the end of the film is reached at the supply reel, film stoppage halts the sprocket 18 for a sufficient time indicating completion of projection and the projector 14 automatically terminates the projection cycle and initiates a rewind cycle during which the film strip feed direction is reversed. During rewind, the pawls 32 do not engage the film strip and the snubber roll stop 30 is retracted so that the snubber roll 70 now operates merely as a guide roller. Also during rewind, the drive spindle 20 becomes operative to rotate the gear 60 in a clockwise direction as depicted by the arrows in FIG. 2 of the drawings. Clockwise rotation of the gear 60 will effect a counterclockwise rotation of the gear 86. Such a reversal in the direction of the gear 86 will throw the rocker arm 90 to the position illustrated in FIG. 2 wherein the gear 92 engages the supply reel 42 while the gear 94 is held out of engagement with the take-up reel 44.

During rewind, the angular velocity at which the gear 60 is driven by the drive sprocket 20 is initially substantially constant such that the linear velocity of the film strip increases due to the convolute winding on the supply reel. However, since the latter will also increase the film drag at the capstans, the conventional projector drive clutches will ultimately slip and limit the maximum speed attained. Additionally to accommodate this variation in linear film strip speed, the capstans 56 and 72 may be coupled to the gear hubs 58 and 74 by slip clutches so as to allow relative rotation between the capstans and the gears 60 and 76 when the latter are rotating in the rewind (clockwise) direction. Upon completion of the film strip rewind, the cassette 10 is partially ejected for removal from the well 12.

As noted, the illustrated embodiment of the present invention is designed for use with a specific projector having a pair of drive spindles, etc. However, it can be appreciated that the basic arrangement can be utilized with other projectors having various cassette-receiving means and drive systems. For example, projectors having a single drive sprocket may be employed to directly drive the sun gear 86 of the illustrated embodiment. By driving the latter gear in forward (cw) and rewind (ccw) directions, capstan operation and transmission shifting will be achieved in a manner identical to that described. Further, it should be noted that other means for isolating the pawl drive from the supply reel, e.g., a bobulator, may be employed rather than the first capstan in conjunction with the shiftable transmission or other means for coupling the projector drive to the film spools may be employed with the capstan isolation.

Thus it will be appreciated that as a result of the present invention an improved large capacity film cassette is provided and by which the aforementioned objectives are completely fulfilled. Also it will be apparent to those skilled in the art from the foregoing description that changes and/or modifications may be made in the disclosed embodiment without departing from the invention manifested by the embodiment. Accordingly, it is expressly intended that the foregoing description is illustrative of a preferred embodiment only, not limiting, and that the true spirit and scope of the present invention be determined by reference to the appended claims.

What is claimed is:

1. A large capacity film cassette for use with projection apparatus having a cassette-receiving well of a size and configuration to receive a limited capacity cassette which includes a pair of radially spaced film strip reels mounted for rotation around parallel axes, and the apparatus including a pair of drive sprockets engagable with the reels of such a limited capacity cassette to effect forward and rewind operation of said reels, said large capacity film cassette comprising:

a large capacity supply reel and large capacity take-up reel;

a housing enclosing and supporting said supply reel and take-up reel in [radially] spaced relation for rotation [around parallel axes], said housing having a projector mounting tongue portion of a size and shape to be received in the receiving well of the projecting apparatus;

means within said housing for guiding a film strip between said supply reel and take-up reel and through an operative projection station within said tongue portion; and transmission means within said housing for coupling the drive sprockets of the projection apparatus with either said supply reel or said take-up reel while said tongue portion is received in the well, said transmission means including means shiftable between engagement with either said take-up reel or said supply reel in accordance with the direction of rotation of the drive sprockets to effect driving coupling of the drive sprockets respectively therewith during forward and rewind driving operations, and said transmission means comprising a pair of shiftable gears alternately engagable with either said supply reel or said take-up reel, and rocker means for supporting said shiftable gears so that one of said pair of gears engages said take-up reel for rotation thereof to take up the film strip during forward operation and the other of said pair of gears engages said supply reel for rotation thereof during rewind operation of the projection apparatus.

2. The cassette recited in claim 1 wherein said shiftable gears are planet gears in meshing engagement with a reversible sun gear wherein said rocker means comprises a rocker arm pivoted on the axis of said sun gear.

3. The cassette recited in claim 2 wherein said rocker arm is automatically pivoted in the direction of rotation of said sun gear by frictional drag between said rocker arm and said gun gear.

4. The cassette recited in claim 2 including a pair of drive gears in meshing engagement with said gun gear, each of said drive gears having means for coupling engagement with the drive sprockets of the projection apparatus.

5. A large capacity film cassette for use with projection apparatus having a cassette-receiving well of a size and configuration to receive a limited capacity cassette which includes a pair of radially spaced film strip reels mounted for rotation around parallel axes, and the apparatus including a pair of drive sprockets engagable with the reels of such a limited capacity cassette to effect forward and rewind operations of said reels, said large capacity film cassette comprising:

a large capacity supply and a large capacity take-up reel;

a housing enclosing and supporting said supply and take-up reels in [radially] spaced relation for rotation [around parallel axes], said housing having a projector mounting tongue portion of a size and shape to be received in the receiving well of the projecting apparatus;

means within said housing for guiding a film strip between said supply and take-up reels and through an operative projection station within said tongue portion; and transmission means within said housing for coupling the drive sprockets of the projection apparatus with said supply and take-up reels while said tongue portion is received in the well, said transmission means including means shiftable between engagement either with said take-up reel or said supply reel in accordance with the direction of rotation of the drive sprockets to effect driving coupling of the drive sprockets respectively therewith during forward and rewind driving operation, and said transmission means comprising a pair of radially spaced drive gears journalled for rotation around parallel axes in said tongue portion, each of said drive gears having a hub provided with a socket for direct engagement by the drive sprockets of the projecting apparatus.

6. The apparatus recited in claim 5 wherein said film strip guiding means comprises a first capstan fixed in concentric driving engagement with the axis of one of said drive gears, a second capstan fixed in concentric driving engagement with the axis of the other of said drive gears, the film strip passing from said supply reel about said first capstan and from said second capstan then through said operative projection station to said second capstan to said take-up reel, and a snubber located in said tongue portion between said operative projection station and said second capstan, and wherein said transmission means for coupling the drive sprocket with said supply and take-up reels includes said pair of radially spaced drive gears and wherein said means shiftable between engagement with either said take-up reel or said supply reel is in accordance with direct rotation of said drive gears and includes respectively therewith during forward and rewind driving a pair of shiftable gears alternatively engagable with either said supply reel or said take-up reel, and rocker means to support said shiftable gears so that one of said pair of shiftable gears engages said take-up reel for rotation thereof to take up the film strip during forward operation and other of said pair of gears engages said supply reel for rotation thereof during rewind operation of the projection apparatus.

7. The cassette recited in claim 5 wherein said film strip guiding means comprises a [first] capstan fixed in concentric driving engagement with the axis of one of said drive gears, [a second capstan fixed in concentric driving engagement with the axis of the other of said drive gears,] the film strip passing from said supply reel about said [first] capstan then through said operative projection station [to said second capstan and from said second capstan] to said take-up reel, and a snubber located in said tongue portion between said operative projection station and said [second capstan] take-up reel.

*8. The cassette recited in claim 7 wherein said transmission means includes means intercoupling said drive gears for driving both in accordance with driven operation of either of said drive sprockets.*

* * * * *